A. BLANCHARD.
Wick-Trimmer.
No. 223,027. Patented Dec. 30, 1879.
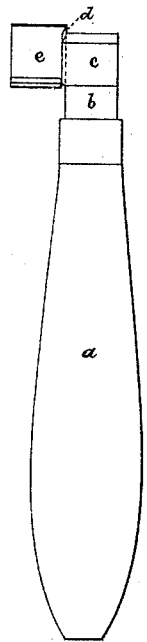
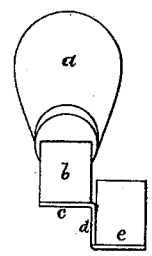
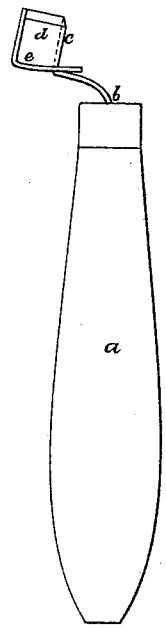
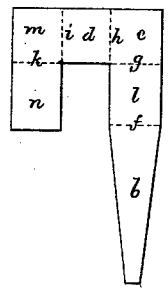
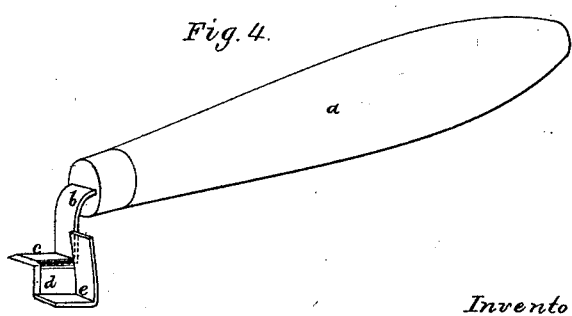
Witnesses
Inventor.
Alfred Blanchard.
by attorney

UNITED STATES PATENT OFFICE.

ALFRED BLANCHARD, OF CHELSEA, MASSACHUSETTS.

IMPROVEMENT IN WICK-TRIMMERS.

Specification forming part of Letters Patent No. 223,027, dated December 30, 1879; application filed July 28, 1879.

*To all whom it may concern:*

Be it known that I, ALFRED BLANCHARD, of Chelsea, of the county of Suffolk and State of Massachusetts, have invented a new and useful Improvement in Lamp-Wick Clearers; and I do hereby declare the same to be described in the following specification and represented in the accompanying drawings, of which—

Figure 1 is a top view, Fig. 2 a side elevation, Fig. 3 a front view, and Fig. 4 a perspective view, of a lamp-wick clearer of my invention.

Its purpose is to effect the removal of carbon or incrustations thereof from the flat wick of the burner of a lamp.

As shown, the wick-clearer consists not only of a shank, $b$, projecting from a handle, $a$, as represented, and a blade, $c$, extending from such shank, but of another blade, $d$, and a catch-all or receiver, $e$, the latter being disposed at the side of blade $d$, which is at a right angle to the blade $c$, all being as shown in the drawings.

At their front edges the two blades are sharpened or beveled down, in order to trim or scrape a wick.

The catch-all is an angular trough disposed alongside of or abutting endwise against the blade $d$, in manner as represented.

The shank, two blades, and catch-all or waste-receiver may be made of a single piece of plate metal, formed as shown in Fig. 5, such piece being bent at a right angle, or thereabout, at each of the dotted lines $f\ g\ h\ i\ k$. In other words, the part $l$ is to be bent down relatively to the shank $b$, the blade $c$ being afterward bent up at a right angle to the part $l$. Next, the blade $d$ is to be bent down at a right angle to the blade $c$, after which the part $m$ is to be bent up to a right angle with the blade $d$. Finally, the part $n$ is to be bent up, so as to stand at a right angle to the part $m$, and also to the blade $d$, at its back.

To use the implement, the blades $c$ and $d$ are to be moved across the carbonized part of a lamp-wick, from one to the other edge thereof, so as to scrape the incrustation from the top and one side of the wick, and cause the deposit to fall into and be caught by the receiver. Next, the implement is to be turned and moved along the top and other side of the wick, so as to free the latter from the carbon thereon. In this manner the article may be employed to much advantage in removing the incrustation from a wick without rendering it necessary at the time to remove any portion of the wick or reduce such wick in length, as takes place when the incrusted part of the wick is cut off with scissors in order to remove the incrustation.

I claim—

The lamp-wick clearer substantially as described, composed of the receiver $e$, the two blades $c\ d$, and the shank $b$, all combined with each other and a handle, substantially as set forth.

ALFRED BLANCHARD.

Witnesses:
 R. H. EDDY,
 W. W. LUNT.